C. G. DE LAVAL.
FRANGIBLE WASHER.
APPLICATION FILED APR. 19, 1918.
1,324,036.
Patented Dec. 9, 1919.
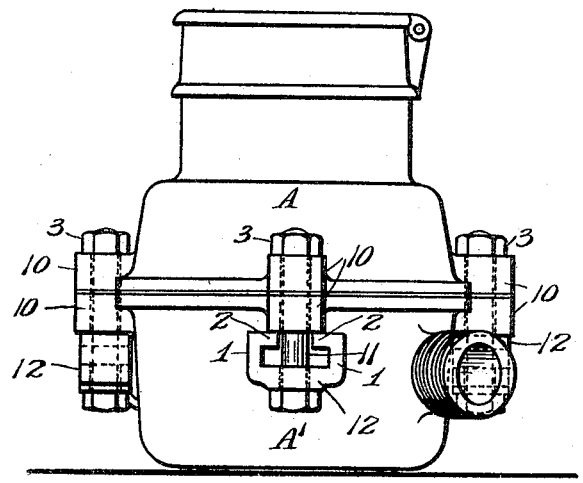
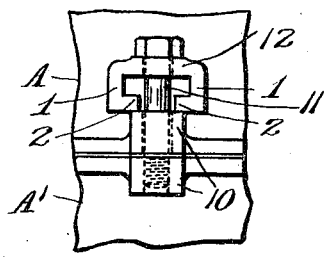
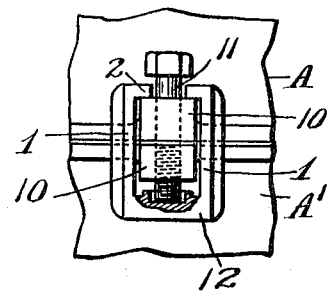
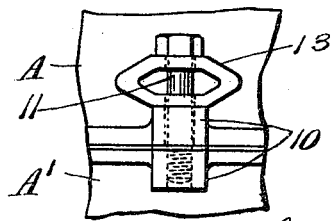
Inventor:
Carl George de Laval
by his Attys:
Philipp Sawyer Rice & Kennedy

UNITED STATES PATENT OFFICE.

CARL GEORGE DE LAVAL, OF ORANGE, NEW JERSEY, ASSIGNOR TO HENRY R. WORTHINGTON, OF NEW YORK, N. Y., A CORPORATION OF NEW JERSEY.

FRANGIBLE WASHER.

1,324,036.      Specification of Letters Patent.      Patented Dec. 9, 1919.

Original application filed July 31, 1915, Serial No. 42,996. Divided and this application filed April 19, 1918. Serial No. 229,530.

*To all whom it may concern:*

Be it known that I, CARL GEORGE DE LAVAL, a citizen of the United States, residing at Orange, county of Essex, and State of New Jersey, have invented certain new and useful Improvements in Frangible Washers, fully described and represented in the following specification and the accompanying drawings, forming a part of the same.

This invention relates to a frangible washer intended especially for use in water meters of those classes in which the casing is made with two parts held together by a frangible connection such as to be broken and allow the casing parts to separate on freezing, thus avoiding breakage of the casing or injury to the meter parts, this class of meters being commonly known as frost proof meters.

The especial object of the invention is to provide a simple, cheap and convenient frangible means for securing the parts of the casing together, which will break without injury to any of the parts of the casing, and which shall be applicable generally to meters in which the parts of the casing are bolted together, so that no special construction of meter casing is required but an ordinary meter may be made frost proof by using my device.

In the accompanying drawing forming a part of this specification, the invention is illustrated in a device of the preferred form as applied to water meters, and certain modifications thereof, and these will now be described in detail and the features forming the invention then specifically pointed out in the claims.

In the drawings—

Figure 1 is a side elevation of a disk meter made frost proof by washers embodying the invention.

Fig. 2 is a detail view of a portion of Fig. 1, showing the same washer as in Fig. 1, but with the casing parts and washer secured in a different manner.

Figs. 3 and 4 are detail views similar to Fig. 1, showing modified forms of washers.

In the drawings, the meter shown is a common type of disk meter, having the casing formed in two parts A, A', and secured together by external lugs 10 receiving bolts 11. In the construction of meters without the frost proof feature, these bolts 11 are secured by nuts or passed through one lug and screwed into the other. For a frost proof meter in accordance with my invention, a frangible clamping piece is placed between the bolt head and one of the lugs 10, so that by the breaking of this frangible member, the two parts of the casing will be allowed to separate on the bolt, and without breaking or detaching the latter.

In the preferred form shown in Figs. 1 and 2, the frangible clamping piece is a washer 12 which consists of a cross bar or disk having an opening through which the bolt is passed, and two arms 1 extending parallel with and on opposite sides of the bolt and having inwardly extending flanges 2, which rest against the lug 10. As shown in Fig. 1, the washer 12 is on the lower side of the lugs, and the bolt is simply passed through the washer and lugs and drawn up tight to secure the parts together by nut 3, while in Fig. 2 the washer 12 is applied above the lugs 10, and bolt 11 passes through the upper lug and is screwed into the lower lug. The flanges 2 are so constructed as to break under a certain pressure and permit the lugs and casing parts to separate on bolts 11. Thus the device has spaced portions and frangible U-shaped yokes connecting them.

In Fig. 3 a modified form of frangible washer is shown, in which the arms 1 are of sufficient length to allow the disk or cross bar to lie on one side of the two lugs, and the flanges 2 to overlap the opposite side of the lugs, the bolt 11 then being passed through one lug and screwed through the other against the cross bar or disk, of the clamping piece.

In Fig. 4 a construction similar to Fig. 2 is shown, except that the flanges on the arms are united into a cross bar or disk, and the arms and flanges are inclined to the bolt 11, thus forming a hollow frangible washer 13 between the bolt head and lug 10, the action being secured by the breaking of the washer being the same as by the breaking of the flanges or other parts of the frangible washers shown in Figs. 1 to 3.

It will be understood that the invention is not limited to the exact form or construction of any of the frangible washers shown, but that these may be modified within the invention defined by the claims. While the invention is especially intended for water meters, it will be understood that it is applicable generally in constructions in which it is desired that the parts shall yield and separate on excessive pressure from freezing or otherwise.

This is a division of my application Serial No. 42,996, filed July 31st, 1915, now Patent 1,269,064, June 11, 1918.

What I claim is:

1. A rigid washer having spaced portions connected by a frangible portion and adapted to break when said spaced portions are moved toward one another.

2. A rigid washer having spaced portions and frangible U-shaped yokes connecting them adapted to break when said spaced portions are moved toward one another.

3. A rigid washer having spaced portions connected by arms, said washer being adapted to break under an excessive pressure against the spaced portions.

In testimony whereof I have hereunto set my hand.

CARL GEORGE DE LAVAL.